(12) United States Patent
Yunk et al.

(10) Patent No.: US 7,465,901 B2
(45) Date of Patent: Dec. 16, 2008

(54) POWER CORD SYSTEM FOR WELDING-TYPE DEVICES

(75) Inventors: Thomas G. Yunk, Shiocton, WI (US); Albert M. Nowak, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 95 days.

(21) Appl. No.: 10/904,887

(22) Filed: Dec. 2, 2004

(65) Prior Publication Data

US 2006/0118533 A1 Jun. 8, 2006

(51) Int. Cl.
*B23K 9/10* (2006.01)
*H01R 29/00* (2006.01)

(52) U.S. Cl. ............... 219/130.1; 219/136; 439/172

(58) Field of Classification Search .............. 219/130.1, 219/136, 137 PS; 439/172
See application file for complete search history.

(56) References Cited

U.S. PATENT DOCUMENTS

| | | | |
|---|---|---|---|
| 1,275,693 A | 8/1918 | Hubbell | |
| 2,417,928 A | 3/1947 | Guernsey | |
| 2,450,657 A | 10/1948 | Guernsey | |
| 2,989,719 A | 6/1961 | Aarlaht | |
| 3,025,486 A | 3/1962 | Falconer | |
| 3,382,475 A | 5/1968 | Kramer | |
| 3,953,097 A * | 4/1976 | Graham | ............ 439/307 |
| 3,996,546 A | 12/1976 | Hugly | |
| 4,131,805 A | 12/1978 | Austin et al. | |
| 4,273,409 A | 6/1981 | Blanche et al. | |
| 4,815,983 A | 3/1989 | Erickson et al. | |
| 4,856,999 A | 8/1989 | Flohr | |
| 4,911,649 A | 3/1990 | Helmich | |
| 4,997,381 A | 3/1991 | Oh | |
| 5,319,533 A | 6/1994 | Reynolds et al. | |
| 5,446,641 A | 8/1995 | Reynolds et al. | |
| 5,540,596 A | 7/1996 | Bothe et al. | |
| 5,601,741 A | 2/1997 | Thommes | |
| 5,684,689 A * | 11/1997 | Hahn | ............ 363/146 |
| 6,002,103 A | 12/1999 | Thommes | |
| 6,049,142 A | 4/2000 | Wakefield | |
| 6,699,052 B1 | 3/2004 | Poran | |
| 6,720,527 B2 | 4/2004 | Gadamus et al. | |
| 2002/0190042 A1* | 12/2002 | Gadamus et al. | ......... 219/130.1 |

* cited by examiner

*Primary Examiner*—Kevin P Kerns
(74) *Attorney, Agent, or Firm*—Ziolkowski Patent Solutions Group, SC

(57) ABSTRACT

A system and method for powering a welding-type device from a plurality of distinct outlet configurations is disclosed. The power cord system includes a power cord having a plurality of conductors extending therethrough. An end of the power cord is constructed to engage an individual adapter of a plurality of adapters. Each of the plurality of adapters has a prong configuration that is different than a prong configuration of the other adapters such that each of the plurality of adapters is constructed to electrically connect the power cord to a uniquely configured outlet. A welding-type device according to the present invention is quickly and efficiently adaptable to operate at a plurality of different input power signals.

16 Claims, 5 Drawing Sheets

POWER CORD SYSTEM FOR WELDING-TYPE DEVICES

BACKGROUND OF THE INVENTION

The present invention relates generally to welding-type devices, and more particularly, to a power cord system for communicating different power signals to a welding-type device.

Known welding-type devices generally include a power source that is constructed to generate a power signal suitable for welding-type applications from a power signal input to the welding-type device. The power signal delivered to the welding-type device can be provided from an internal generator powered by an internal combustion engine or another external power source such as a conventional outlet. Conventional wall outlets are provided in a plurality of prong configurations wherein different prong configurations may provide the same or different power signals. Typical power signals provided at such outlets can include 110-115V, 15 A; 110-115V, 20 A; 215-230V, 50 A power signals, the latter of which can be configured differently in residential versus industrial applications. It is understood that these particular power signals are merely exemplary and other types of power signals can commonly be delivered to an electrical outlet for powering devices connected thereto.

Welding has applications in many industries and in many situations that arise therein. In any dynamic work environment, repairs or manufacturing may not always be easily and efficiently completed at one workstation. That is, a significant portion of the actual operating of the welding-type devices is completed at locations remote from a storage or non-use location of the welding-type device. Due in part to the new compact designs of welding-type devices and resulting ease of portability, these welding-type devices can now be moved about a work environment or from one location to another wherever welding-operations might be required. Often times, the electrical supplies throughout a facility, or from one location to another, are not uniform. That is, a different location may have power signals that are different than the power signal that the welding-type device is currently configured to receive.

In such circumstances, prior welding-type devices require that the plug or the entire cord of the welding-type device be changed to engage a respective outlet. Changing the plug requires physically severing the cord attached to the plug and individually connecting the wires of the cord to each terminal for each prong of the new plug. Changing the entire power cord requires removing the housing cover, removing the individual wires of the original power cord from connection to the welding-type device, then attaching the individual wires of the new power cord thereto, and then replacing the housing cover to the welding-type device. Changing the cord or the plug presents the potential that an operator may improperly connect the plug to the power cord or improperly connect the power cord to the welding-type device. Improper connection of the welding-type device to a power source could result in machine malfunction, machine inoperability, or damage to the components thereof. Additionally, repeatedly changing the plug or the entire cord of the welding-type device is time consuming and reduces process efficiencies.

Additionally, when an operator changes the entire cord or the plug associated with the welding-type device, the operator may also be required to adjust the controls of the welding-type device to match the power source of the welding-type device to the power signals provided thereto. Failure to properly configure the power source of the welding-type device to receive the power signals delivered, or the outlet with which the plug is configured to be engaged, can result in damage or in-operability to the electrical components of the welding-type device or damage to the source to which it is connected. As such, not only must the operator be attentive to the physical connection of the individual conductors of the power cord to the appropriate prongs of a plug or the physical connection of the individual conductors of the power cord to the power supply, but must also ensure that the controls of the welding-type device are configured correctly for the power signal delivered.

It would therefore be desirable to have a system and method capable of connecting a welding-type device to a plurality of differently configured outlets such that the welding-type device is operable with a plurality of different input signals.

BRIEF DESCRIPTION OF THE INVENTION

The present invention provides a system and method of connecting a welding-type device to a plurality of outlet configurations that overcome the aforementioned drawbacks. Moreover, the outlet configurations can have similar or different electrical signal characteristics. The power cord system includes a power cord that has a first end connected to a transformer of a welding-type device and a second end operably engageable with a plurality of adapters. Each adapter is constructed to engage an outlet having a unique receptacle configuration such that only a corresponding plug is engageable therewith.

In accordance with one aspect of the present invention, an electrical adapter is disclosed to connect a welding-type apparatus to alternate power supply configurations. The adapter includes a body having a first end and a second end opposite the first end. The first end includes a number of prongs extending therefrom. The number of prongs is configured to engage an electrical supply outlet. The second end is constructed to removeably engage a power cord. The second end includes a number of conductors connectable to the power cord that is greater than the number of the number of prongs of the first end.

According to another aspect of the present invention, a welding-type device is disclosed that includes a power source configured to generate a power signal suitable for welding-type applications. The device also includes a transformer electrically connected to the power source and a cord. The device includes a number of adapters, each adapter having a first plug configuration that is different than a first plug configuration of at least one other adapter of the number of adapters and a second plug configuration that is common to the at least one other adapter of the number of adapters. The cord includes a number of conductors passing therethrough and includes a first end connectable to the transformer of the welding-type device and a second end having a cord plug configuration that is engageable with the second plug configuration of each of the number of adapters.

According to a further aspect of the present invention, a power cord kit is disclosed that includes a first adapter having a number of prongs. The number of prongs includes a prong configuration to engage an outlet constructed to deliver a power signal of approximately 115V. The kit also includes a second adapter having a number of prongs. The number of prongs includes a prong configuration to engage an outlet constructed to deliver a power signal of approximately 230V. The power cord includes a first end connectable to either one of the first and second adapters, and the power cord includes at least one more conductor than the number of prongs on either one of the first and second adapters.

In accordance with yet another aspect of the present invention, a method of powering a welding-type device is disclosed that includes providing a power cord a number of conductors and a first end connectable to a welding-type device, and a second end non-connectable to a standard outlet. The method also includes adapting the second end of the power cord to engage a first outlet configuration and electrically connect the welding-type device to the first outlet by a first set of conductors of the number of conductors. Additionally, the method includes adapting the second end of the power cord to engage a second outlet configuration different than the first outlet configuration and electrically connect the welding-type device to the second outlet by a second set of conductors of the number of conductors different than the first set of conductors.

Yet another aspect of the present invention discloses a welding-type device that includes a power source constructed to generate a power signal suitable for welding-type applications. The device also includes a power cord having a number of conductors and one end attached to the power source, and a means for switching from one set of conductors to another to maintain power source operability at different power supply signals.

Various other features, objects and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

As one skilled in the art will fully appreciate, the hereinafter description of welding-type devices not only includes welders but may also include any system such as heating and cutting systems. Additionally, a person skilled in the art will further appreciate that the present invention is applicable to any device that may be operated at a plurality of different input power signals. Reference to welding power, welding-type device, welding-type power, or welders generally, includes welding, cutting, or heating power. Description of a welding-type apparatus or device illustrates just one embodiment in which the present invention may be implemented. Understandably, the present invention is equivalently applicable with other systems that are desirable to be powered at multiple impact powers, such as for cutting and heating.

Figure 1:
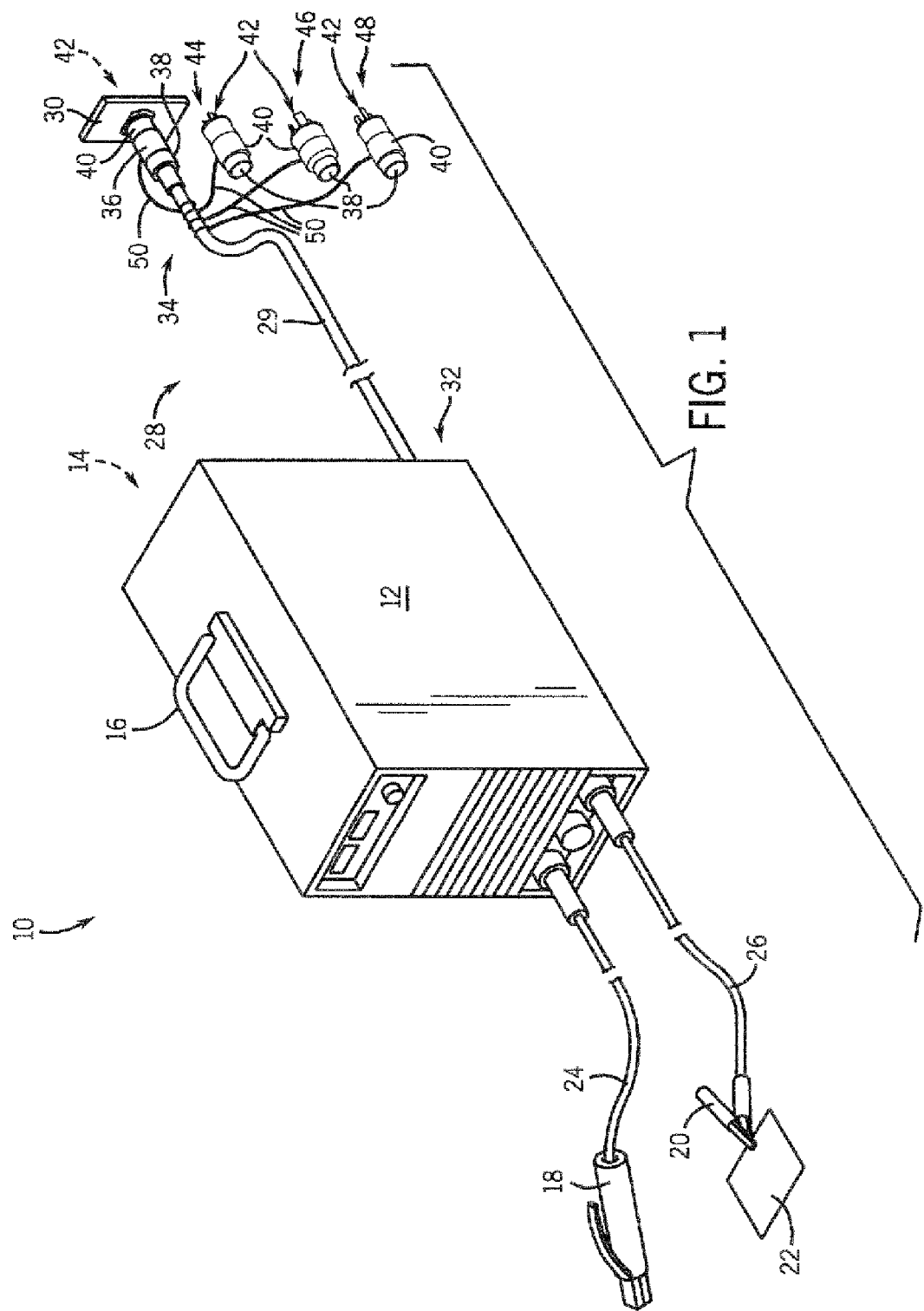
FIG. 1 perspective view of a welding-type device incorporating the power cord system and plurality of adapters of the present invention.

Referring now to FIG. 1, a perspective view of a welding device 10 applicable with the present invention is shown. Welding device 10 includes a housing 12 enclosing the internal components, including a welding-type power supply 14 and other components necessary for carrying out a particular welding-type process. Optionally, the welding device 10 includes a handle 16 attached to housing 12 for transporting the welding system from one location to another. To effectuate the welding process, such as TIG or MIG welding, the welding device includes a torch 18 as well as a work clamp 20. The work clamp 20 is configured to ground a workpiece 22 to be welded. As is known, when an electrode (not shown) extending from torch 18 is positioned in relative proximity to workpiece 22, a welding arc or cutting arc results, depending upon the particular welding desired. A pair of cables 24 and 26 electrically connect the torch 18 and work clamp 20 to the welding-type power supply 14 located in housing 12, respectively.

As shown in FIG. 1, a power cord assembly 28 extends from welding device 10 and is constructed to electrically connect welding-type power supply 14 with an external power source such as a power grid represented by outlet 30. Power cord assembly 28 includes a power cord 29 having a first end 32 electrically connected to welding-type power supply 14 and a second end 34 having an adapter 36 connected thereto. Adapter 36 has a first end 38 constructed to electrically engage second end 34 of power cord 29 and a second end 40 having a plurality of prongs 42 extending therefrom and configured to engage outlet 30. Such a construction allows an operator to quickly and efficiently electrically connect and disconnect welding device 10 to an electrical outlet having a particular configuration.

Also shown in FIG. 1, power cord assembly 28 includes a second, third, and fourth adapters 44, 46, 48. Each adapter 36, 44, 46, 48 has a first end 38 that is substantially similar to the first ends of the other adapters such that each of the adapters is individually connectable to second end 34 of power cord 29. Additionally, each of adapters 36, 44, 46, 48 has a second end 40 having a plurality of prongs 42 extending therefrom. The plurality of prongs 42 of each of adapters 36, 44, 46, 48 is uniquely oriented as compared to the plurality of prongs of each of the other adapters. That is, the plurality of prongs 42 of each of adapters 36, 44, 46, and 48 is unique to each individual adapter such that each individual adapter 36, 44, 46, 48 is configured to electrically engage a respective outlet having a receptacle orientation that is configured to receive the plurality of prongs 42 of an adapter associated therewith. As such, power cord assembly 28 is operably engageable with a plurality of electrical outlets wherein each of the electrical outlets is differently configured. Accordingly, any device equipped with power cord assembly 28 can be powered by a plurality of unique electrical signals across plug interfaces with differing plug orientations.

Also shown in FIG. 1, each adapter 36, 44, 46, 48 may be equipped with a lanyard or tether 50 such that the adapters that are not electrically engaged with power cord 29 are securely attached to the power cord assembly 28 such that they are transportable therewith. Accordingly, separate storage and location of each of the individual adapters is not required. That is, when an operator changes the adapter connected to power cord 29, each of the adapters can be quickly and efficiently located along power cord 29 between the adapter connected thereto and welding device 10. Optionally, each adapter may receive a removable cover, such as a plastic housing, to protect the prongs of the adapters not in use from dirt, debris, corrosion, and the like.

Figure 2:
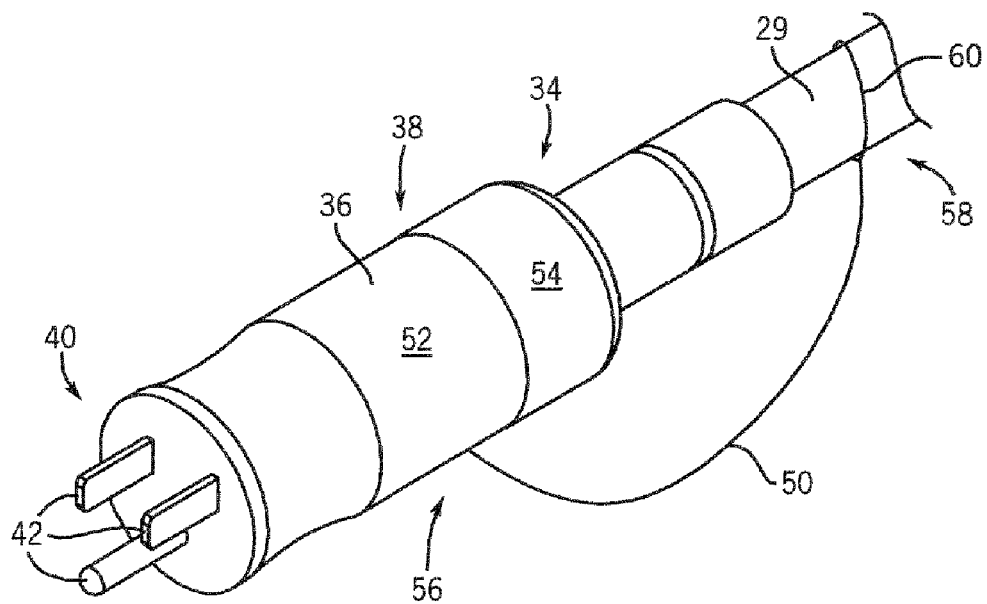
FIG. 2 is a perspective view of an end of the power cord shown in FIG. 1 with a respective adapter attached thereto.

FIG. 2 shows power cord 29 having an adapter 36 attached thereto and the plurality of prongs 42 of adapter 36 removed from an outlet as shown in FIG. 1. The plurality of prongs 42 extend from second end 40 of adapter 36 such that they are electrically engageable with an outlet when plugged therein. Adapter 36 has a body 52 that extends between second end 40 having plurality of prongs 42 positioned thereat and first end 38. First end 38 of adapter 36 is constructed to electrically and mechanically couple the adapter to second end 34 of power cord 29. Power cord 29 has a collar 54 rotatably attached thereto. Collar 54 threadingly engages first end 38 of each of adapters 36, 44, 46, 48 such that each of the adapters are individually connectable to power cord 29 with collar 54. Lanyard 50 of adapter 36 has a first end 56 that is attached to body 52 of adapter 36 and a second end 58 having a loop 60 thereat. Loop 60 of lanyard 50 encircles power cord 29 such that adapter 36 is secured thereto regardless of whether the adapter is engaged with collar 54 of power cord 29.

Figure 3:
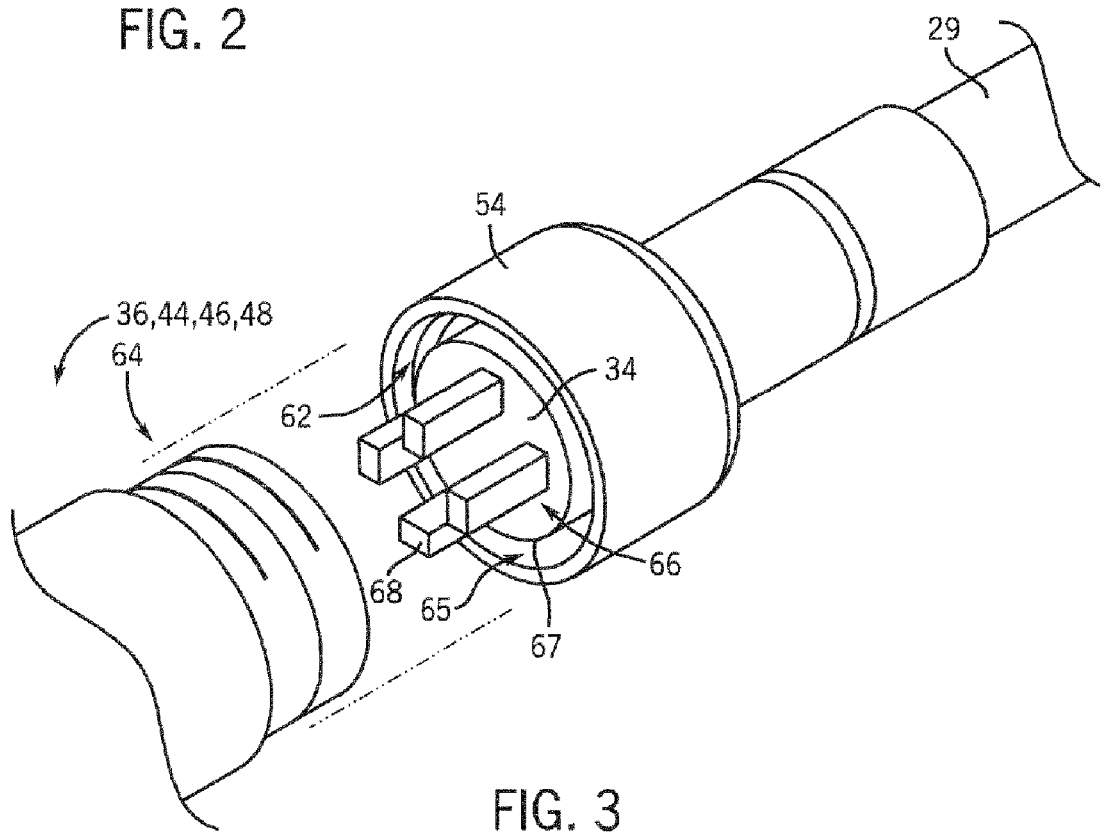
FIG. 3 is a perspective view of the power cord system shown in FIG. 2 with the respective adapter removed therefrom.

As shown in FIG. 3, adapters 36, 44, 46, 48 are removeably engageable with second end 34 of power cord 29. Collar 54 is rotatably attached to power cord 29 such that rotation of collar 54 relative to power cord 29 allows a threading 62, internal to collar 54, to threadingly engage a threading 64 of adapters 36, 44, 46, 48, respectively. A channel 65 is formed between second end 34 of power cord 29 and collar 54 and is constructed to snuggly engage a respective adapter 36, 44, 46, 48. Such a construction forms a relatively robust connection that is capable of extended operation in harsh work environments.

A plurality of contacts 66 extend from second end 34 of power cord 29 within a perimeter 67 of channel 65. Each contact 66 is electrically isolated from the other contacts 66 of power cord 29. Power cord 29 includes four wires (not shown) passing therethrough, one for each contact 66, the importance of which is described further below with respect to FIG. 6. It is equally understood that a power cord having four contacts is merely exemplary and providing a power cord having a number of contacts other than four is within the scope of the present claims.

Plurality of contacts 66 include an indexing contact 68 oriented generally transverse to the remaining plurality of contacts 66 such that indexing contact 68 rotationally orients adapter 36, 44, 46, 48 during a connection process. Such a construction ensures that the individual prongs of an adapter attached to power cord 29 are electrically coupled to a desired contact 66 of power cord 29.

Figure 4A:
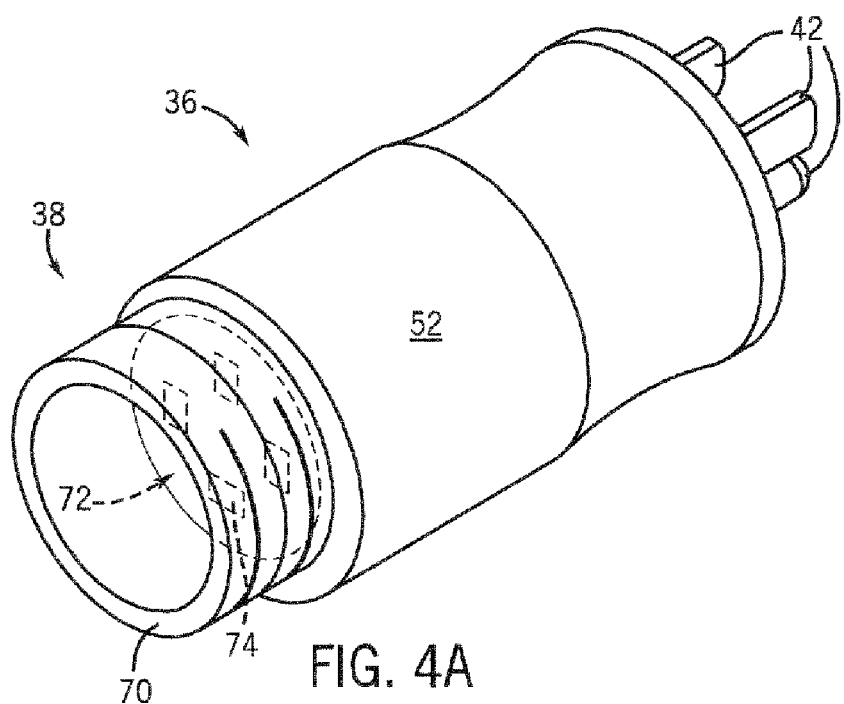
FIG. 4A is a perspective view of an adapter with the recesses of the adapter constructed to engage the power cord shown in phantom therein.

Referring to FIGS. 3 and 4A, first end 38 of adapter 36 is shown. The construction of first end 38 is substantially similar for each of adapters 36, 44, 46, 48 such that each of the adapters is connectable to power cord 29. Adapter 36 includes a shoulder 70 that extends from first end 38 of body 52 of the adapter. Shoulder 70 is constructed to be snuggly and threadingly received in channel 65 of power cord 29 shown in FIG. 3 such that collar 54 threadingly engages shoulder 70 thereby securely connecting adapter 36 and power cord 29. Each adapter 36, 44, 46, 48 includes a plurality of receptacles 72 formed in second end 38 thereof. Receptacles 72 are constructed to electrically engage contacts 66 of power cord 29. Additionally, receptacles 72 include an indexing receptacle 74 that is oriented generally transverse to the other receptacles 72 and is constructed to only engage indexing contact 68 of power cord 29. The cooperative relationship between the indexing contact 68 of power cord 29 and indexing receptacle 74 of each of adapters 36, 44, 46, 48 ensures repeatable connectability between the individual adapters and power cord 29 with the prongs 42 of the respective adapter 36, 44, 46, 48 properly associated with the desired contacts 66 of power cord 29.

Figure 4B:
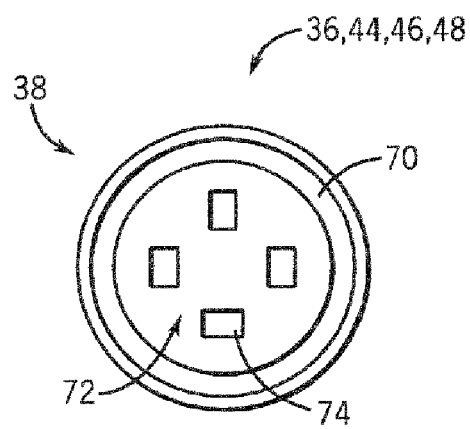
FIG. 4B is an elevational view of an end of a respective adapter that is constructed to engage an adapter end of the power cord.

FIG. 4B shows first end 38 of adapter 36, 44, 46, 48. First end 38 is generally uniform among adapters 36, 44, 46, 48 which supports each of the adapters being connectable to the power cord. Shoulder 70 extends from each adapter 36, 44, 46, 48 such that the shoulder generally surrounds plurality of receptacles 72 and indexing receptacle 74. Such a construction allows shoulder 70 to protect the integrity of receptacles 72 when a respective adapter is not attached to power cord 29 and ensures quick and efficient attachment of a desired adapter 36, 44, 46, 48 to power cord 29.

Figure 5A:
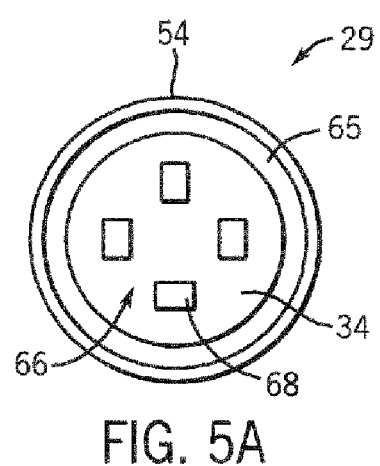
FIG. 5A is an elevational view of the adapter end of the power cord shown in FIG. 3.
Figure 5D:
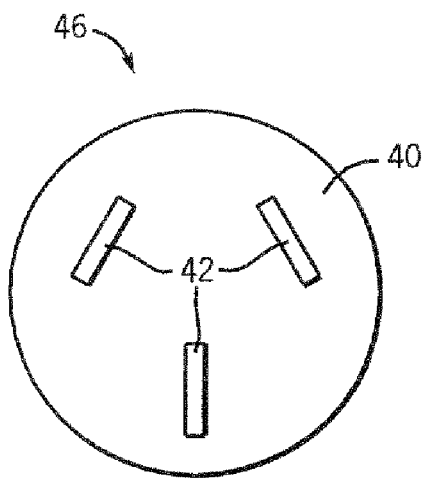
FIGS. 5B-5E are elevational end views showing the respective prong orientation of each of the adapters shown in FIG. 1.
Figure 5E:
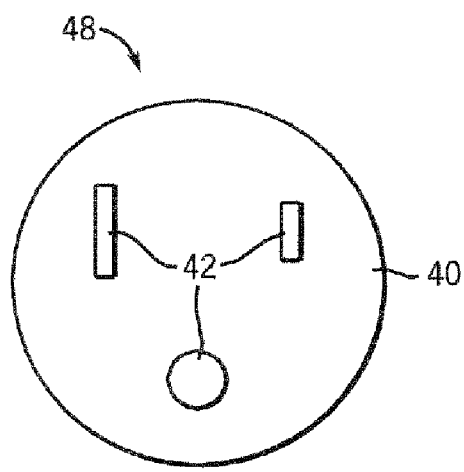

As shown in FIG. 5A, second end 34 of power cord 29 is constructed to operatively engage first end 38 of each of adapters 36, 44, 46, 48 shown in FIG. 4B. Plurality of contacts 66 of power cord 29 are non-linearly arranged to slidingly engage plurality of receptacles 72, shown in FIG. 4B, of adapters 36, 44, 46, 48 when indexing contact 68 of power cord 29 is axially aligned with indexing receptacle 74 of any of adapters 36, 44, 46, 48. Rotation of collar 54 relative to power cord 29 securely attaches a respective adapter 36, 44, 46, 48 thereto for connection with a desired electrical outlet.

Figure 5B:
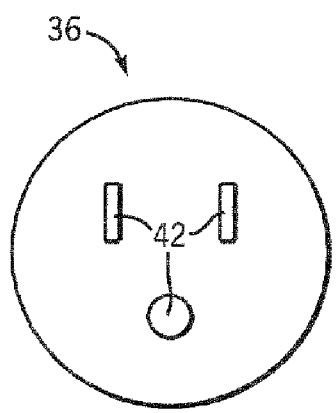
Figure 5C:
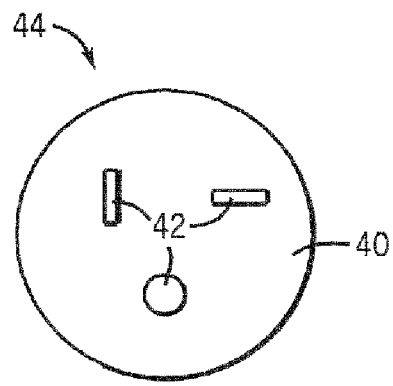

FIGS. 5B-5E show the respective second ends 40 of exemplary adapters 36, 44, 46, and 48. Each adapter includes a plurality of prongs 42 oriented to engage a corresponding outlet for supplying power to the welding-type device attached to the respective adapter via the power cord. As shown in FIG. 5B, plurality of prongs 42 of adapter 36 are oriented to engage an electrical outlet generally constructed to provide a power signal of approximately 115V, 15 A. Alternatively, when a 115V, 15 A electrical outlet is not readily available, adapter 44, shown in FIG. 5C, can be attached to the power cord. Adapter 44 includes a plurality of prongs 42 oriented to engage a 115V, 20 A electrical outlet thereby providing electrical connection of the welding-type device to an external power source such as a power grid. Alternatively, when neither of the previous outlets configurations are available, adapter 46, shown in FIG. 5D, includes a plurality of prongs 42 oriented to engage a 230V, 50 A electrical outlet. However 230V, 50 A electrical outlets are commonly provided in two distinct orientations. Adapter 48, shown in FIG. 5E also includes a plurality of prongs 42 oriented to engage an alternate 230V, 50 A electrical outlet configuration. As such, regardless of which electrical outlet configuration a particular work site prefers or is available, a device including the present power cord system is connectable therewith. It is understood that the specific prong orientations disclosed above are merely exemplary and further that any number of adapters can be provided to electrically connect the welding-type device with a plurality of differently configured electrical outlets. It is also understood that the number of prongs extending from the adapter may also vary depending on the number of recesses formed in a particular outlet configuration. That is, although each adapter 36, 44, 46, 48 is shown to have three individual prongs 42 extending therefrom, other numbers of prongs may be provided to engage alternate outlet configurations. The power cord system of the present invention forms a highly versatile welding-type device that can be operated at a plurality of distinct electrical inputs and simply and efficiently adapted from connectable with a first outlet orientation to connectable with another outlet orientation different than the first outlet orientation.

Figure 6:
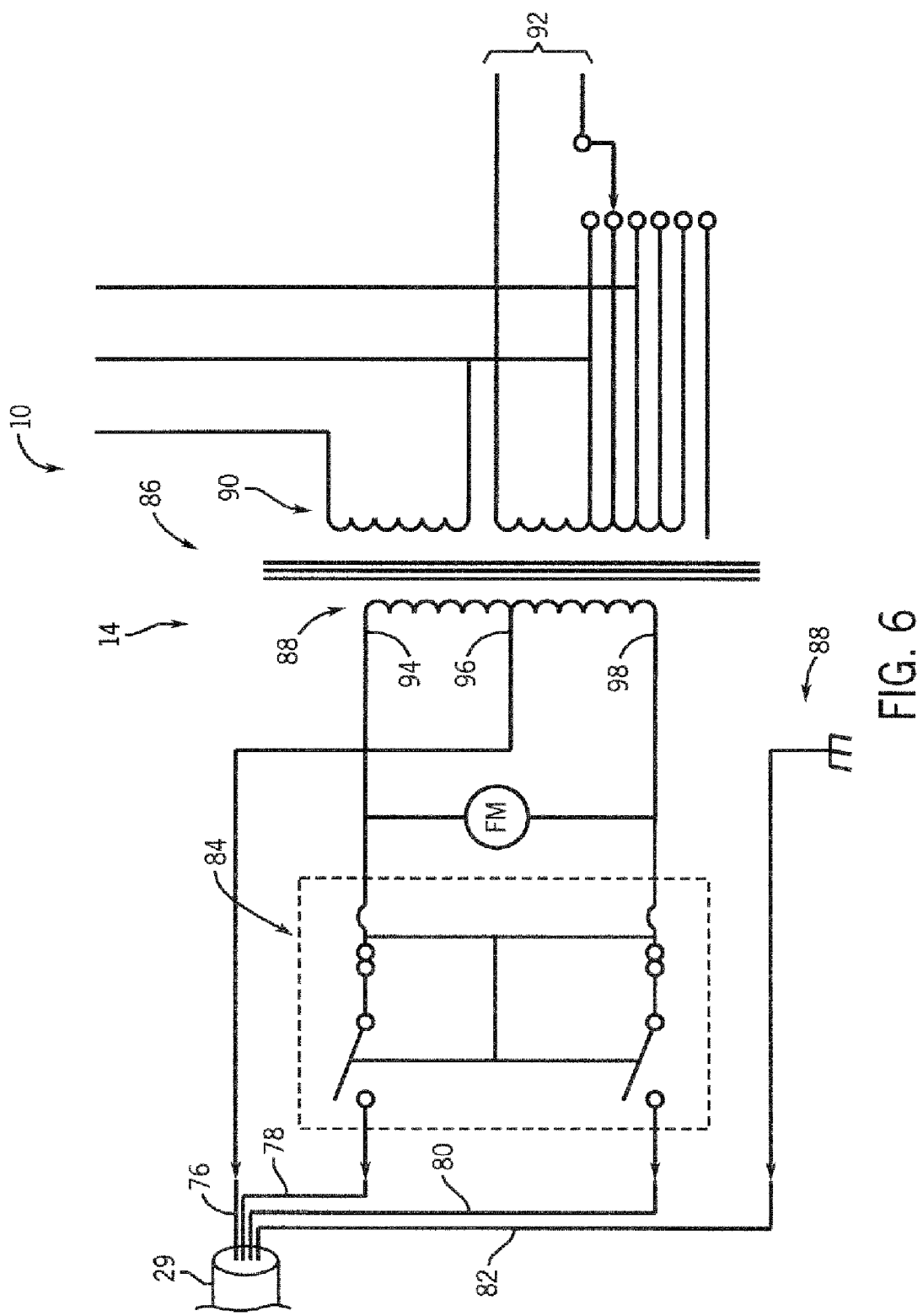
FIG. 6 is a schematic representation of the connection of the power cord shown in FIG. 1 to the transformer of the power supply of the welding-type device shown therein.

FIG. 6 is a schematic illustrating connection of power cord 29 to power supply 14 of welding-type device 10. Power cord 29 includes a series of electrically isolated conductors 76, 78, 80, 82, the number of which exceeds that necessary to operate the power source. Conductors 76, 78, 80, 82 extend between power supply 14 of welding-type device 10 and contacts 66 of power cord 29 shown in FIG. 3. Conductors 78, 80 are connected through a switch array 84 into a transformer 86 of power supply 14 of welding type device 10. Conductor 76 is connected directly to transformer 86 and conductor 82 is connected to a ground 88 of welding-type device 10. The prongs of the individual adapters are oriented to be selectively aligned with the appropriate contacts of the power cord according to the supplied voltage and current such that the individual conductors 76, 78, 80, 82 of power cord 29 are connected to an input side 88 of transformer 86 such that no operator adjustment is required beyond changing the respective adapter to configure the welding-type device to operate at the power signal corresponding to the outlet configuration associated with the adapter. Understandably, an operator may desire to further adjust a weld power signal communicated from an output side 90 of transformer 86. Welding-type device 10 is provided with an output power adjustment 92 that allows an operator to adjust the power signal received from output side 90 of transformer 86; however, power cord 29 is connected to power supply 14 of welding-type device 10 such that power supply 14 switchlessly generates a power signal suitable for welding-type applications regardless of the adapter attached thereto.

Comparing FIGS. 5B-5E and FIG. 6, it can be appreciated that power cable 29 includes a greater number of conductors 76, 78, 80, 82 than the number of prongs 42 of any of the individual adapters 36, 44, 46, 48. Such a construction allows a common power cord to communicate different power signals to appropriate points of contact of the power supply of the welding-type device. That is, an operator is not required to operatively select an incoming power signal configuration of the power supply. Power supply 14 is constructed to communicate the power signal input through conductors 76, 78, 80, 82 of power cord 29 to the appropriate portion of transformer 86. Referring to FIG. 6, when an adapter configured to engage an outlet having a 230V output is connected to power cord 29, conductors 78 and 80 communicate with the power leads of the outlet such that a 230V potential is achievable between taps 94 and 98 of transformer 86. When an adapter configured to engage a 115V outlet is attached to power cord 29, power is communicated from the outlet to taps 96 and 98 of transformer 86 such that a 115V potential is achievable therebetween. Accordingly, regardless of which adapter 36, 44, 46, 48 is connected to power cord 29, transformer 86 is constructed to receive the input power therefrom and communicate a power signal suitable for generating a welding-type power to output side 90 of transformer 86 of power supply 14.

Therefore, the present invention includes an electrical adapter to connect a welding-type apparatus to alternate power supply configurations. The adapter includes a body having a first end and a second end opposite the first end. The first end includes a number of prongs extending therefrom. The prongs are configured to engage an electrical supply outlet. The second end is constructed to removeably engage a power cord. The second end includes a number of conductors connectable to the power cord that is greater than the number of the prongs of the first end.

The present invention also includes a welding-type device having a power source configured to generate a power signal suitable for welding-type applications. The device also includes a transformer electrically connected to the power source and a cord. The device includes a number of adapters, each adapter having a first plug configuration that is different than a first plug configuration of at least one other adapter of the number of adapters and a second plug configuration that is common to the at least one other adapter of the number of adapters. The cord includes a number of conductors passing therethrough and includes a first end connectable to the transformer of the welding-type device and a second end having a cord plug configuration that is engageable with the second plug configuration of each of the number of adapters.

The present invention further includes a power cord kit having a first adapter having a number of prongs. The number of prongs includes a prong configuration to engage an outlet constructed to deliver a power signal of approximately 115V. The kit also includes a second adapter having a number of prongs. The number of prongs includes a prong configuration to engage an outlet constructed to deliver a power signal of approximately 230V. The power cord includes a first end connectable to either one of the first and second adapters, and the power cord includes at least one more conductor than the number of prongs on either one of the first and second adapters.

The present invention also includes a method of powering a welding-type device that includes providing a power cord a number of conductors and a first end connectable to a welding-type device, and a second end non-connectable to a standard outlet. The method also includes adapting the second end of the power cord to engage a first outlet configuration and electrically connect the welding-type device to the first outlet by a first set of conductors of the number of conductors. Additionally, the method includes adapting the second end of the power cord to engage a second outlet configuration different than the first outlet configuration and electrically connect the welding-type device to the second outlet by a second set of conductors of the number of conductors different than the first set of conductors.

The present invention further includes a welding-type device that has a power source constructed to generate a power signal suitable for welding-type applications. The device also includes a power cord having a number of conductors and one end attached to the power source, and a means for switching from one set of conductors to another to maintain power source operability at different power supply signals.

The present invention has been described in terms of the preferred embodiment, and it is recognized that equivalents, alternatives, and modifications, aside from those expressly stated, are possible and within the scope of the appending claims.

What is claimed is:

1. A system for connecting a welding-type apparatus to alternate power supply configurations comprising:

a power cord connected to a transformer of a power source, the power source constructed to generate a power signal suitable for welding-type applications;

an adapter having a first end and a second end opposite the first end, the first end having a plurality of prongs extending therefrom, the plurality of prongs configured to engage an electrical supply outlet, and the second end constructed to removeably engage the power cord, the second end having a number of receptacles connectable to the power cord that is greater than a number of the plurality of prongs of the first end;

wherein the power cord includes a number of wires extending therethrough equal to the number of receptacles of the second end of the adapter and wherein none of the number of wires are connected in common; and wherein all of the number of wires remain electrically isolated when the adapter is engaged to the power cord.

2. The system of claim 1 wherein the number of prongs of the first end of the adapter is three and the number of receptacles of the second end of the adapter is four.

3. The system of claim 1 wherein at least one of the number of receptacles of the second end of the adapter is non-conductive and all remaining receptacles of the number of receptacles are conductive.

4. The system of claim 1 wherein the adapter further comprises a plurality of threads formed about the second end, the plurality of threads configured to threadingly attach the adapter to the power cord.

5. The system of claim 1 wherein at least one of the number of receptacles of the second end of the adapter is defined as an index receptacle, the index receptacle shaped to rotationally orient the number of receptacles of the second end of the adapter and the power cord.

6. The system of claim 1 further comprising a recess formed in the second end of the adapter proximate the number of receptacles of the second end, the recess constructed to snugly receive an end of the power cord therein to axially orient the power cord thereto.

7. The system of claim 1 wherein each of the number of receptacles of the second end of the adapter have a generally uniform cross-section and wherein at least one of the number of conductors has a cross-section that is oriented generally transverse to a cross-section of at least one other conductor of the number of conductors and rotationally orients the electrical adapter to the power cord.

8. The system of claim 1 wherein the plurality of prongs of the first end of the adapter are configured to engage at least one of a 115V, 15 A outlet; a 115V, 20 A outlet, and a 230V outlet.

9. The system of claim 1 wherein the number of wires of the power cord includes a first wire connected to an intermediate tap of the transformer, a second wire connected to an end of the transformer, a third wire connected to another end of the transformer, and a fourth wire connected to an electrical ground.

10. A power cord kit comprising:
a power cord having a first end connectable to an adapter and including a number of leads connectable to a welding-type power source;
first and second adapters, each having a plurality of prongs and a plurality of receptacles, the plurality of prongs having a prong configuration to engage an outlet and the plurality of receptacles having a configuration to engage the power cord, wherein a different one of the plurality of receptacles is disconnected from all of the number of leads of the power cord connectable to the welding-type power source in each of the first and second adapters when connected to the power cord.

11. The power cord kit of claim 10 wherein the plurality of receptacles of the first adapter and the plurality of receptacles of the second adapter each include at least one indexing receptacle having a shape different than at least one other receptacle of the respective plurality of receptacles.

12. The power cord kit of claim 10 wherein the prong configuration of the first adapter is arranged to connect to a 115V outlet and the prong configuration of the second adapter is arranged to connect to a 230V outlet.

13. The power cord kit of claim 10 further comprising a tether extending between each of the first, second, and third adapters and the power cord.

14. The power cord kit of claim 10 wherein the first end of the power cord includes a number of contacts greater than a number of prongs of the plurality of prongs of the first adapter and greater than a number of prongs of the plurality of prongs of the second adapter.

15. The power cord kit of claim 10 wherein the power cord further comprises a rotatable collar attached thereto, the rotatable collar constructed to engage and secure one of the first, second, and third adapters to the power cord.

16. The power cord kit of claim 10 wherein the number of leads of the power cord include a first lead connectible to an intermediate tap of a transformer, a second lead connectible to an end of a transformer, a third lead connectible to another end of a transformer, and a fourth lead connectible to an electrical ground.

* * * * *